United States Patent [19]

Ribka

[11] 4,024,124
[45] May 17, 1977

[54] MONOAZO ACETOACETYLAMINOBENZIMIDAZO-LONE PIGMENTS CONTAINING CARBOXY GROUP

[75] Inventor: Joachim Ribka, Offenbach am Main, Germany

[73] Assignee: Hoechst Aktiengesellschaft, Frankfurt am Main, Germany

[22] Filed: June 14, 1974

[21] Appl. No.: 479,563

Related U.S. Application Data

[63] Continuation-in-part of Ser. No. 280,085, Aug. 14, 1972, abandoned, which is a continuation-in-part of Ser. No. 58,698, July 27, 1970, abandoned.

[30] Foreign Application Priority Data

Aug. 2, 1969 Germany ..................... 1939466

[52] U.S. Cl. ..................... 260/157; 260/208; 106/288 Q
[51] Int. Cl.² ........................................ C09B 29/36
[58] Field of Search ..................... 260/157

[56] References Cited

UNITED STATES PATENTS

| | | | |
|---|---|---|---|
| 3,109,842 | 11/1963 | Schilling et al. | 260/157 |
| 3,328,384 | 6/1967 | Dietz et al. | 260/157 |
| 3,555,002 | 1/1971 | Ribka et al. | 260/157 |
| 3,555,003 | 1/1971 | Ribka | 260/157 |
| R25,857 | 9/1965 | Schilling et al. | 260/157 |

FOREIGN PATENTS OR APPLICATIONS 1,939,466  2/1971  Germany ..................... 260/157

Primary Examiner—Charles F. Warren
Attorney, Agent, or Firm—Curtis, Morris & Safford

[57] ABSTRACT

Water-insoluble monoazo dyestuffs of the general formula

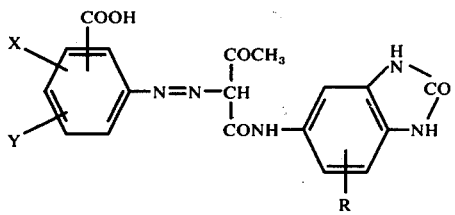

wherein X is hydrogen, halogen, methyl, trifluoromethyl, alkoxy or nitro, Y is hydrogen, halogen carboxylic acid, carboxylic acid methyl ester or carboxylic acid amide and R is hydrogen, halogen, methyl or alkoxy. Said pigments can be used for instance for dyeing or printing plastics, caoutchouc, natural and synthetic resins, textile fibrous materials or paper. Furthermore, they can be employed for the preparation of printing inks, lacquers and dispersion paints. The novel pigments possess good to very good fastness properties.

7 Claims, No Drawings

MONOAZO ACETOACETYLAMINOBENZIMIDAZOLONE PIGMENTS CONTAINING CARBOXY GROUP

This application is a continuation-in-part of our co-pending application Ser. No. 280,085 filed Aug. 14, 1972, now abandoned, which is a continuation-in-part of application Ser. No. 58.698 filed July 27, 1970 (now abandoned).

The present invention relates to new, valuable water-insoluble monoazo dyestuffs of the general formula

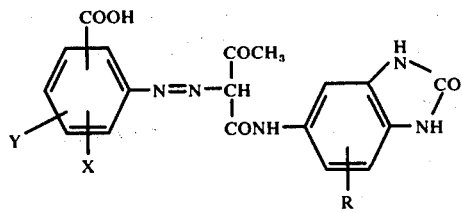

wherein X is hydrogen, halogen, lower alkyl, lower alkoxy, trifluoromethyl or nitro, Y is hydrogen, halogen, carboxylic acid, carboxylic acid lower alkyl-ester, carboxylic acid amide, carboxylic acid lower alkyl amide, carboxylic acid phenyl amide or carboxylic acid halophenyl amide, and R is hydrogen, halogen, lower alkyl or lower alkoxy, and to a process for their preparation, which comprises coupling of diazotized aromatic amines of the general formula

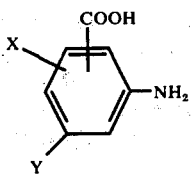

with coupling components of the general formula

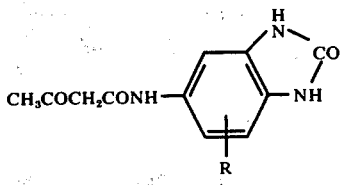

wherein X, Y and R have the above meaning, and more particularly wherein X is hydrogen, chlorine, methyl, trifluoromethyl, methoxy, ethoxy or nitro, Y is hydrogen, chlorine, carboxylic acid, carboxylic acid methyl ester, carboxylic acid, amide carboxylic acid methyl amide or carboxylic acid dichlorophenyl amide, and R is hydrogen, chlorine, bromine, methyl, methoxy or ethoxy. The amino benzoic acids used as diazo components are known, and may be prepared according to known methods. The compounds used as coupling components may be prepared by reacting diketene with the corresponding 5-amino-benzimidazolones.

The coupling reaction may be effected in known manner, for example in organic solvents, particularly in an aqueous medium, optionally in the presence of non-ionogenic, anion-active or cation-active dispersing agents and/or organic solvents.

In order to obtain a particularly convenient crystal structure, it is suitable that the coupling mixture itself or the dyestuff isolated from the coupling mixture by filtration and mixed again with water is heated for some time, for example up to the boiling point or under pressure up to temperatures above 100° C, optionally in the presence of organic solvents such as dichlorobenzene or dimethylformamide or of resin soap. Particularly pure and fast dyeings are obtained with the dyestuffs according to the invention by subjecting the dyestuffs after the coupling reaction as moist pressed cake or as dried powder to an after-treatment with organic solvents such as pyridine, dimethylformamide, alcohol, glycol, glycolmonomethyl ether, glacial acetic acid, chlorobenzene, dichlorobenzene or nitrobenzene, the whole operation being effected at reflux temperature or under pressure at elevated temperature, or grinding the dyestuffs subsequently by adding grinding auxiliaries. The dyestuffs may also be coupled in the presence of carrier substances suitable for color lake preparation.

The new pigment dyestuffs are suitable for preparing printing colors, color lakes and dispersion paints, for dyeing caoutchouc, plastic materials and natural or synthetic resins. The new dyestuffs are furthermore suitble for pigment printing on substrates, especially textile fibre materials or other materials having a flat surface such as paper. The dyestuffs may serve also for other purposes, for example in a finely divided form for coloration of rayon from viscose or cellulose ethers or cellulose esters, polyamides, polyurethanes, polyglycolterephthalates or polyacrylonitriles in the spinning mass or of coloring paper.

The pigments may be worked well into the above-mentioned media. The dyeings display good fastnesses to light, weathering and bleeding, and are resistant to the action of heat and chemicals, for example solvents. The pigments show a clean yellow shade which comes close to the yellow shade of the Kodak color control patches. These color control patches are widely used as standard shades in the graphic industry. It is desirable to have pigments with standard shades since such pigments facilitate matching of other shades by mixing with other pigments. Furthermore, the pigments have a very good hiding power and are fast to overlacquering.

EXAMPLE 1

13.7 parts by weight of anthranilic acid are mixed while stirring with 250 parts by volume of water and 50 parts by volume of 5N hydrochloric acid and diazotized with 20 parts by volume of 5 N sodium nitrite solution.

At 25° C this diazo solution is poured while stirring into an acetic acid suspension of the coupling component prepared in the following way:

24 parts by weight of 5-acetoacetylamino-benzimidazolone are mixed while stirring with 200 parts by volume of water at room temperature and dissolved by adding 60 parts by volume of 5N sodium hydroxide solution. This solution is clarified with charcoal and the clarified solution is added dropwise within 30 minutes, while stirring, to a solution of 30 parts by volume of water, 41 parts by volume of glacial acetic acid and 80 parts by volume of 5N sodium hydroxide solution. When the coupling is completed, the resulting dyestuff is suction-filtered, washed with water, dried and pulverized. Subsequently, the obtained yellow pigment is refluxed for 2 hours in 500 parts by volume of glacial acetic acid, suction-filtered, washed and dried. A soft grained pigment having good tinctorial strength and a pure shade is obtained.

When incorporated in polyvinyl chloride, a lacquer, a printing color or a dispersion paint, yellow dyeings of good fastness to light, excellent fastness to overvarnishing and very good fastness to bleeding in polyvinylchloride are obtained. If the dyestuff is incorporated in an oil-in-water or a water-in-oil suspension, printing pastes are obtained which permit the dyeing of textile fabrics, for example cotton, in yellow shades with good fastness to light and dry cleaning.

The incorporation in polyvinylchloride is effected, for example, according to the following process:

16.5 parts by weight of a plasticizer mixture consisting of equal parts of dioctylphthalate and dibutylphthalate are mixed with 0.05 parts by weight of titanium dioxide. Then 33.5 parts by weight of polyvinylchloride are added. The mixture is friction-rolled for 10 minutes on a double-roller mill, the resulting film being continuously cut with a spatula and rolled up. During this operation, one roller is kept at a temperature of 40° C, the other is kept at 140° C. Thereafter, the mixture is stripped off as a film and pressed for 5 minutes at 160° C between two polished metal plates. According to this example the diazo and coupling components as shown in the following Table may be used. The shade obtained by the pigments prepared in this manner is stated in the right column.

| Diazo component | Coupling component | Shade |
| --- | --- | --- |
| 1-aminobenzene-2-carboxylic acid | 6-chloro-5-acetoacetyl-aminobenzimidazolone | yellow, greenish |
| " | 7-chloro-5-acetoacetyl-aminobenzimidazolone | " |
| 1-amino-5-chloro-benzene-2-carboxylic acid | 5-acetoacetylamino-benzimidazolone | yellow |
| " | 7-bromo-5-acetoacetyl-aminobenzimidazolone | " |
| 1-amino-4-chloro-benzene-2-carboxylic acid | 5-acetoacetylamino-benzimidazolone | yellow, greenish |
| 1-amino-5-nitro-benzene-2-carboxylic acid | " | " |
| 1-amino-5-trifluoro-methyl-benzene-2-carboxylic acid | " | " |
| 1-amino-benzene-3-carboxylic acid | " | " |
| 1-aminobenzene-4-carboxylic acid | " | yellow |
| 1-amino-2-methyl-benzene-5-carboxylic acid | " | yellow, greenish |
| 1-amino-2-chloro-benzene-5-carboxylic acid | " | " |
| " | 6-methyl-5-acetoacetyl-aminobenzimidazolone | yellow |
| 1-amino-2-methoxy-benzene-5-carboxylic acid | 7-methoxy-5-acetoacetyl-aminobenzimidazolone | yellow, reddish |
| " | 5-acetoacetylamino-benzimidazolone | " |
| 1-amino-2-carbo-methoxybenzene-5-carboxylic acid | " | yellow, greenish |
| 1-aminobenzene-2-carboxylic acid-5-carboxylic acid amide | " | " |
| 1-aminobenzene-2-carboxylic acid-5-carboxylic acid amide | 7-ethoxy-5-acetoacetyl-aminobenzimidazolone | yellow |
| 1-amino-2-ethoxy-benzene-5-carboxylic acid | 5-acetoacetylamino-benzimidazolone | " |
| 1-amino-2,4-dichloro-benzene-5-carboxylic acid | " | " |
| 1-aminobenzene-2-carboxylic acid-5-carboxylic acid- | 5-acetoacetylamino-benzimidazolone | yellow |

-continued

| Diazo component | Coupling component | Shade |
| --- | --- | --- |
| methylamide | | |
| 1-aminobenzene-2-carboxylic acid-5-carboxylic acid-2',5'-dichlorophenylamide | " | " |
| 1-aminobenzene-3,5-dicarboxylic acid | " | yellow, greenish |
| 1-amino-2-nitro-benzene-4-carboxylic acid | " | yellow |
| 1-aminobenzene-2,5-dicarboxylic acid | " | " |
| 2-amino-4-carbomethoxy-benzoic acid | 5-acetoacetylamino benzimidazolone | orange |

I claim:

1. A water-insoluble azo dyestuff of the formula

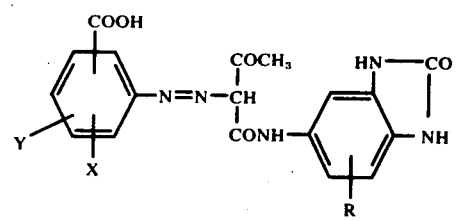

wherein X is hydrogen, chlorine, bromine, methyl, lower alkoxy, trifluoromethyl or nitro, Y is hydrogen, chlorine, carboxylic acid, carboxylic acid methyl ester, carboxylic acid amide, carboxylic acid lower alkyl amide, carboxylic acid phenyl amide or carboxylic acid dichlorophenyl amide, and R is hydrogen, chlorine, bromine, methyl or lower alkoxy.

2. A water-insoluble azo dyestuff of the formula

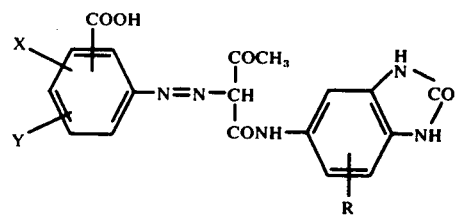

wherein X is hydrogen, chlorine, methyl, trifluoromethyl, methoxy, ethoxy or nitro, Y is hydrogen, chlorine, carboxylic acid, carboxylic acid methyl ester, carboxylic acid amide, carboxylic acid methyl amide or carboxylic acid dichlorophenyl amide, and R is hydrogen, chlorine, bromine, methyl, methoxy or ethoxy.

3. The dyestuff of formula

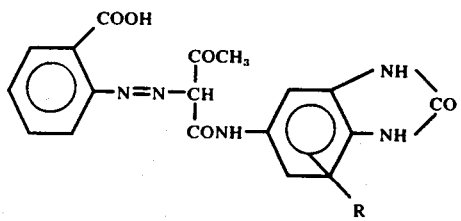

wherein R is hydrogen or chlorine.

4. The dyestuff of the formula

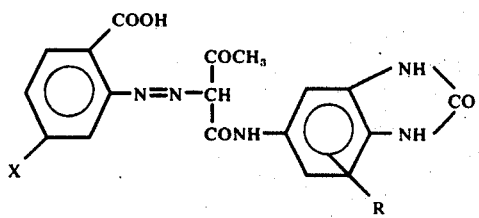
wherein X is chlorine or bromine and R is hydrogen or chlorine.
5. The dyestuff of the formula
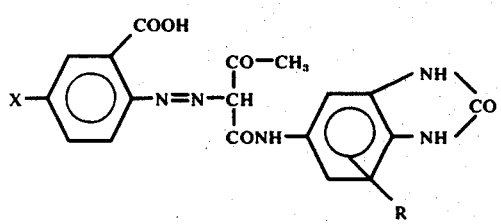
wherein X is chlorine or bromine and R is hyrogen or chlorine.
6. The dyestuff of the formula
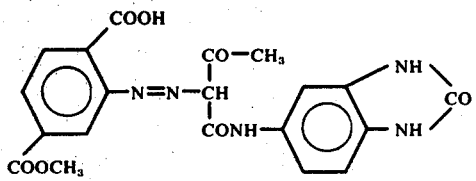
7. The dyestuff of the formula
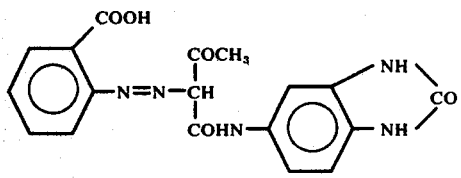
* * * * *